(12) United States Patent
Schulz et al.

(10) Patent No.: US 7,568,993 B2
(45) Date of Patent: Aug. 4, 2009

(54) PLANETARY GEAR TRAIN

(75) Inventors: Horst Schulz, Friedrichshafen (DE); Tino Kirschner, Wasserburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 418 days.

(21) Appl. No.: 10/588,744

(22) PCT Filed: Jan. 15, 2005

(86) PCT No.: PCT/EP2005/000358
§ 371 (c)(1),
(2), (4) Date: Oct. 5, 2006

(87) PCT Pub. No.: WO2005/080823
PCT Pub. Date: Sep. 1, 2005

(65) Prior Publication Data
US 2007/0249460 A1    Oct. 25, 2007

(30) Foreign Application Priority Data
Feb. 11, 2004   (DE) .................. 10 2004 006 723

(51) Int. Cl.
*F16H 57/08* (2006.01)
(52) U.S. Cl. .............. 475/347; 475/336; 475/342; 74/89.42; 74/409; 74/440
(58) Field of Classification Search .......... 475/331, 475/336, 342, 346, 347; 74/89.42, 409, 440
See application file for complete search history.

(56) References Cited

U.S. PATENT DOCUMENTS

| | | | | |
|---|---|---|---|---|
| 1,499,763 A | * | 7/1924 | Davis | 475/336 |
| 5,240,462 A | * | 8/1993 | Mochizuki et al. | 475/342 |
| 5,242,336 A | * | 9/1993 | Hori | 475/336 |
| 5,957,804 A | | 9/1999 | Schulz et al. | |
| 6,220,984 B1 | | 4/2001 | Schulz et al. | |

FOREIGN PATENT DOCUMENTS

| | | |
|---|---|---|
| DE | 2 050 400 B2 | 4/1972 |
| DE | 37 34 462 A1 | 4/1989 |
| DE | 43 25 295 A1 | 2/1995 |
| DE | 195 25 831 A1 | 1/1997 |
| DE | 197 20 255 A1 | 12/1998 |
| DE | 199 28 385 A1 | 12/2000 |
| DE | 101 44 805 | 4/2003 |
| EP | 0 296 376 A2 | 12/1988 |
| EP | 1 188 002 | 3/2002 |

* cited by examiner

*Primary Examiner*—David D. Le
(74) *Attorney, Agent, or Firm*—Davis & Bujold, P.L.L.C.

(57) ABSTRACT

A planetary gear train having planetary gears (8) which are rotatably mounted on a planet carrier (18) and are in toothed contact with an internally toothed ring gear (14) and a sun gear (4). For a simplified, process-safe and inexpensive backlash of the planetary gears (8) without axial displacement of the sun gear (4), the ring gear (14) and the planetary gears (8) are conically designed so that planetary gear axles (16) are retained in the planetary gear carrier (18) at an inclined angle (a) and that the planetary gears (8) are axially movably disposed upon and coordinated with the planetary gear axles (16) and the position of the planetary gears (8) can be adjusted within the planetary train by adjusting mechanisms for adjusting a backlash.

18 Claims, 2 Drawing Sheets

PLANETARY GEAR TRAIN

This application is a national stage completion of PCT/EP2005/000358 filed Jan. 15, 2005 which claims priority from German Application Serial No. 10 2004 006 723.6 filed Feb. 11, 2004.

FIELD OF THE INVENTION

The invention relates to a planetary gear train.

BACKGROUND OF THE INVENTION

The technological problem of economically producing planetary gear trains of poor play design with the usual methods of manufacture is generally known. A solution has been proposed to provide, for example, a combination of limited manufacture tolerances with a classification of planets, ring gears and sun gears divided into several play classes. The play is measured and the adequate matching parts are determined hereafter each intermediate step of assembly. Those assembly methods are no longer economical for specific play requirements due to the number of matching parts to be furnished, to the measuring controls the assembly by reduced measuring controls have not proved process-safe, since an increased reassembly quote of planetary gear trains lying outside the tolerances had to be tabulated.

From EP 1 188 002 B1, a high-geared Wolfrom planetary train having one sun gear, two internally toothed ring gears and planetary gears of bi-conical design is known. The train is driven via the sun gear upon the planetary gears, which mesh with both ring gears. The output takes place via one of the two ring gears, while the other ring gear remains stationary.

Considering this background, the problem on which the invention is based is to offer a planetary gear train which easily makes a process safe, economical and reproducible backlash possible.

SUMMARY OF THE INVENTION

The invention is accordingly based on a planetary gear train with planetary gears supported on a planet carrier and in tooth contact with an internally toothed ring gear and a sun gear. Moreover, the ring gear and the planetary gears are of conical design in this planetary train; the planetary gear axles are retained in the planetary gear carrier at an inclined angle $\alpha$; the planetary gears are disposed axially movably upon the planetary gear axles coordinated therewith, and the position of the planetary gears in the planetary train are adjustable by adjusting means for a backlash.

This construction has the designed advantage that, depending on the adjusting means used, the planetary gears are axially displacable on their planetary gear axle to the extent that, by virtue of the conical ring gear internal toothing the desired backlash adjusts itself.

In an advantageous development of the invention, it is provided that the sun gear has an approximately cylindrical external toothing. In addition, it is considered very important that the cone angle $\beta$ of the tooth flanks of the planetary gears are adapted to the inclined angle $\alpha$ of the planetary gear axles so that the tooth flanks of the sun gear and the tooth flanks of the planetary gears meet each other over the whole tooth width.

At the same time, it is advantageous in this connection that the inclined angle $\alpha$ of the planetary gear axles correspond at least approximately to the angle $\beta$ of the tooth flanks of the planetary gears. According to another development of the invention, it is also provided that the inclined angle $\alpha$ of the planetary gear axles correspond at least approximately to half the cone angle of the tooth flanks of the ring gear.

Another alternative provides that the planet carrier is rotatably supported on the ring gear. For this purpose, it can be provided that two bearings are situated on both sides of the toothing plane of the planetary gears which are preferably positioned between the ring gear and the planet carrier and designed as slanted bearings in O-arrangement.

Another feature of the inventively designed planetary train consists in that the planet carrier is connected with one output shaft of this train while the ring gear is fastened upon an input shaft of a prime mover.

Regarding the play adjusting means, it is considered advantageous that the adjusting means is adjustingly situated between the planetary gear carrier and the planetary gears.

According to one alternative, it can be provided in this connection that the adjusting means between the planetary gear carrier and the ring gear comprise operative fitting discs and/or spacer discs that determine their axial position relative to each other.

According to another alternative, the adjusting means is operatively placed between the planet gear carrier and the planetary gears are designed as spacer pieces disposed coaxially to the planetary gear axles. The spacer pieces can be designed as adjusting springs such as a coil or plate springs, situated coaxially to the planetary gear axles.

According to another alternative, it can be provided that the adjusting means operatively situated between the planetary gear carrier and the planetary gears are designed as continuously feedable grub screws which makes a particularly fine adjustment possible and, in addition, can be adjusted with no disassembly expense.

By this step, the elastic deformation characteristic can be purposefully influenced. It can thus be obtained, for example, that the medium center distances of the planetary gear axles are mutually slightly enlarged so that when the planetary gears are axially fed, the tooth contact between ring gear internal toothing and planetary gear external toothing are first adjusted while thereafter, by further axial feeding without narrowing the tooth contact, the further tooth contact between the planets and the ring gear are adjusted.

In further advantageous development, it can be provided for increased play requirements that additional adjusting means are disposed which determine the axial position of ring gear and planetary gear carrier relative to each other. In an advantageous easy way, this can result, for example, by fitting discs selected by their adequate dimensions which are inserted in an incision of the planetary gear carrier. The play of the train is then adjusted in two steps.

As a first step, preferably with the above mentioned adjusting means operative between planets and carriers, the play between planets and sun is adjusted, while in the second step, the play between ring gear and planets are adjusted. Hereby a separate, exact play adjustment of both tooth contacts can result.

The preferably cylindrical sun gear toothing is in the operating state axially movable without hindrance so that it can be connected directly and without axial step bearings or compensation means with a driving engine shaft, which is typically subject in the operation to thermal changes of length and other axial motions determined by input. All parts decisive for play can be produced with usual, process safe and economical manufacturing tolerances.

In the two-step play adjustment, the material free places can also be advantageously used, since periodical errors typical in manufacture of the parts involved clearly result more rarely in clamping phenomena or other damages.

In further advantageous development, especially in trains having an increased number of planets, a single adjusting means can be provided that is operative between planets and the carriers and acts jointly upon all planets.

It is finally provided that the value of the reduction ratio of the train is less than or equal to twelve.

The invention advantageously makes possible omitting the expensive matching of classified train parts mentioned above. After assembling the train, the tooth flank play is determined without adjusting means and subsequently the desired play is adjusted, via adequate selection of the thickness, for example, of said thrust washers. The inclined planetary gear arrangement results in that with increasing thickness, the planetary gear is shifted on its axle diminishing the tooth face play.

BRIEF DESCRIPTION OF THE DRAWINGS

The invention will now be described, by way of example, with reference to the accompanying drawings in which.

DETAILED DESCRIPTION OF THE INVENTION

Figure 1:
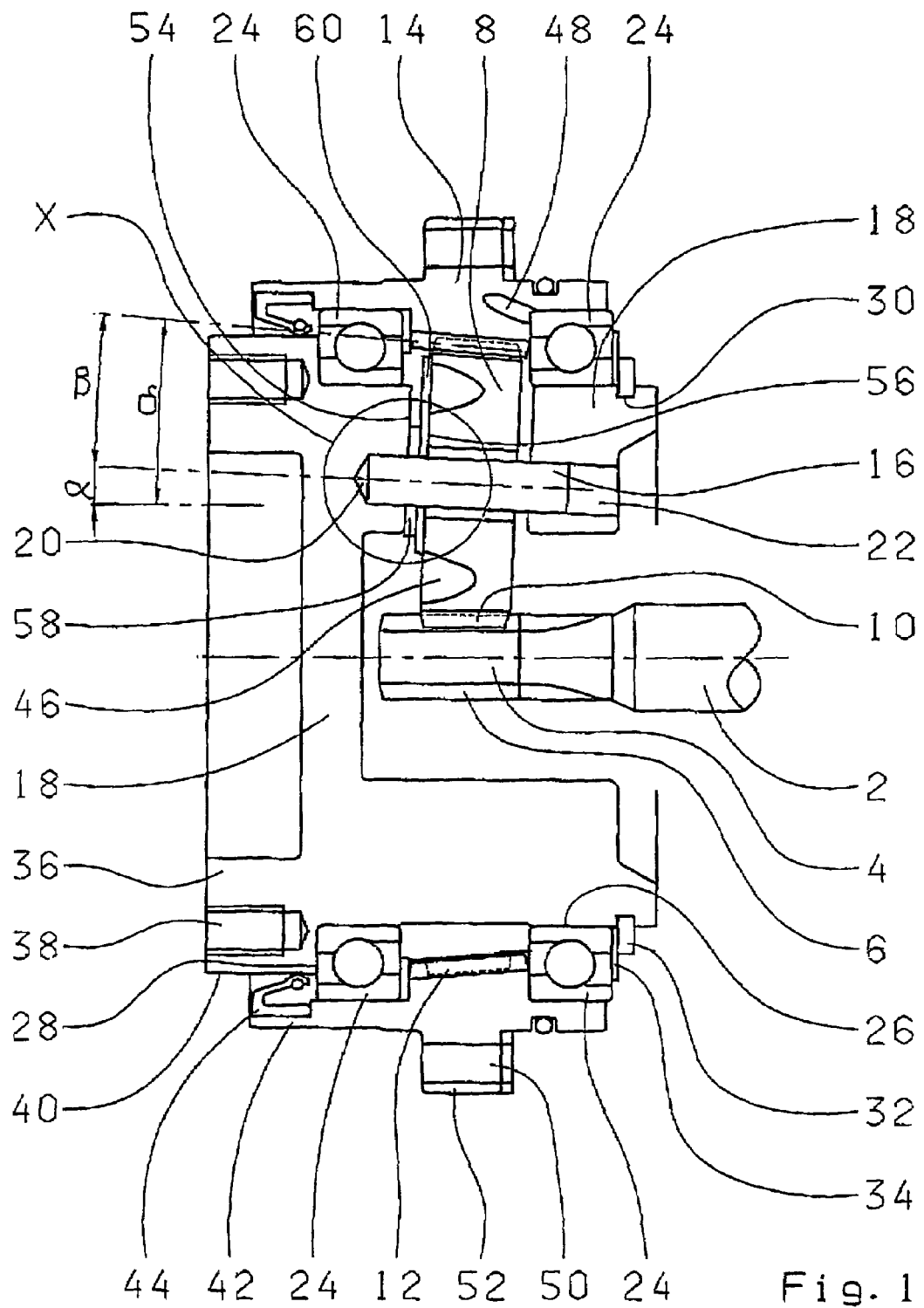
FIG. 1 is a first embodiment of an inventively designed planetary train.

According to FIG. 1, the inventively designed planetary gear train is constructed as follows. One shaft 2 carries one sun gear 4 with an outer toothing 6. In the outer toothing 6, several planetary gears engage of which only one planetary gear 8 is shown horizontally in the drawing. An outer toothing 10 of the planetary gear 8 meshes both with the outer toothing 6 of the sun gear 4 and with an inner toothing 12 of a ring gear 14.

The planetary gear 8 is rotatably mounted on a planetary gear axle 16 which is non-rotatably inserted in a planetary gear carrier 18. The planetary gear axle 16 grippingly engages by its end, lying to the left in FIG. 1, in a blind hole 20 of the planetary gear carrier 18 while the end correspondingly lying to the right supports itself in a through aperture 22.

The ring gear 14 supports itself with intercalation of diagonally adjusted ball bearings 24 on a shoulder 26 of the planetary gear carrier 18. The ring gear 14 is axially secured, relative to the planetary gear carrier 18, by way of contact of the ball bearing 24, lying to the left in FIG. 1, on an axial collar 28 and a fitting disc 32 which is inserted in an incision 30 of the planetary gear carrier 18 and for its part directly abuts on the ball bearing 24 shown to the right with intercalation of a disc 34.

The planetary gear carrier 18 supports a flange 36 in which peripherally distributed threaded holes 38 are made. A radial shaft seal ring 44 is sealingly situated between an external peripheral surface 40 of the flange 36 and a sleeve collar 42 of the ring gear 14.

Moreover, material free places in the form of incisions 46, 48 are inserted in the planetary gear 8 and the ring gear 14. The material free places, coordinated with the planetary gear 8, are designed as the incision 46 revolving with rotational symmetry, but they can also be disposed as several peripherally spaced incisions 46.

The material free place, coordinated with the ring gear 14, is designed as the incision 48 slantingly extending in outer direction with rotational symmetry starting from the ball bearing 24, shown to the right. The ring gear 14 carries an annular flange 52 on its external side having prolonged apertures 50.

The outer toothing 6 of the sun gear 4 is also cylindrically designed in relation to the shaft 2. The planetary gear axles 16 are inclined at an angle $\alpha$ to the shaft 2 and the outer toothing 10 of the planetary gears 8 is conically designed and inclined at a cone angle $\beta$ to the planetary gear axle 16. In addition to the angles $\alpha$ and $\beta$, a total cone angle $\delta$ of the internal toothing 12 to the shaft 2 is comparatively large. The cone angle $\beta$ is adapted to the inclined angle $\alpha$ of the planetary gear axles 16 so that the tooth flanks of the sun gear 4 and the planetary gear 8 meet over their whole tooth width.

Between an inner surface 54 of the planet carrier 18 facing the planetary gear 8 and a front surface 56 of the planetary gear 8 facing it, is situated an adjusting means for backlash of the planetary gear 8 designed as a disc-like spacer piece 58, said spacer piece 58 coming into contact on the planetary gear 8 side on an integrally formed collar 60.

In case of relatively small to medium requirements on the tooth flank play prevalent between the gear wheel pairs outer toothing 6/outer toothing 10 and inner toothing 12/outer toothing 10, the whole train play can be adjusted as follows.

Depending on the desired play, the spacer pieces 58, such as thrust discs of different thickness measure, are inserted. These can be designed as ring-shaped situated coaxially with the planetary gear axle 16 or as the slotted ring which, by way of the slots (not shown), are moved over the planetary gear axle 16.

The axial movability of the planetary gear 8 compared to the planetary gear axle 16 results in that, depending on the thickness of the thrust disc, the tooth plays in both above described gear wheel engagements change in substantially the same way. Both engagements can thus change with one adjusting means.

The incisions 46 and 48 improve the elastic characteristic of the planetary gear train. Shape and cross-sectional surfaces of the incisions 46, 48 are dimensioned so that they purposefully adjust the desired plays for both gear wheel engagements. The incision 46 is dimensioned so that the medium center distance between the planetary gear axles 16 is slightly enlarged compared to an unloaded state. During axial feeding of the planetary gear 8, the tooth contact between inner toothing 12 and outer toothing 10 is here obtained somewhat earlier than in the engagement matching between planetary gear 8 and sun gear 4. When the planetary gear 8 is further axially fed, with calculated elastic deformation of the parts involved in the elastic axial added path, the desired narrow toothing contact between the planetary gear 8 and the sun gear 4 is also achieved.

In case of increased requirements placed on the total train play, separate adjusting means are provided for both tooth engagements. The tooth flank play, between the sun gear 4 and the planetary gear 8, is adjusted in the way described above by way of the spacer piece 58.

The tooth flank play between the planetary gear 8 and ring gear 14 results by adjustment of the relative axial position of the ring gear 14 to the planetary gear carrier 18. To this end, fitting discs 32 and/or discs 34 of dimensions corresponding to the desired tooth flank play are used.

Figure 2:
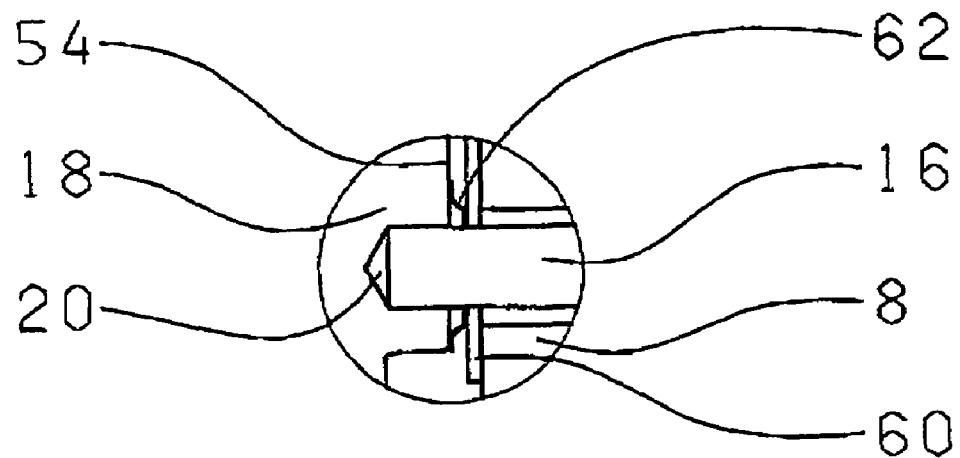
FIG. 2 is a detailed view, according to FIG. 1, of the second embodiment.

FIG. 2 shows in a detailed view, according to FIG. 1, a second embodiment of the adjusting means. A plate spring-like adjusting spring 62 is operative between the collar 60 and the inner surface 54. The spring rate is here selected so that a compressive force, sufficient for the desired tooth flank play, acts upon the planetary gear 8. Otherwise the same steps as in FIG. 1 can be carried out and the same effects obtained with this embodiment.

Figure 3:
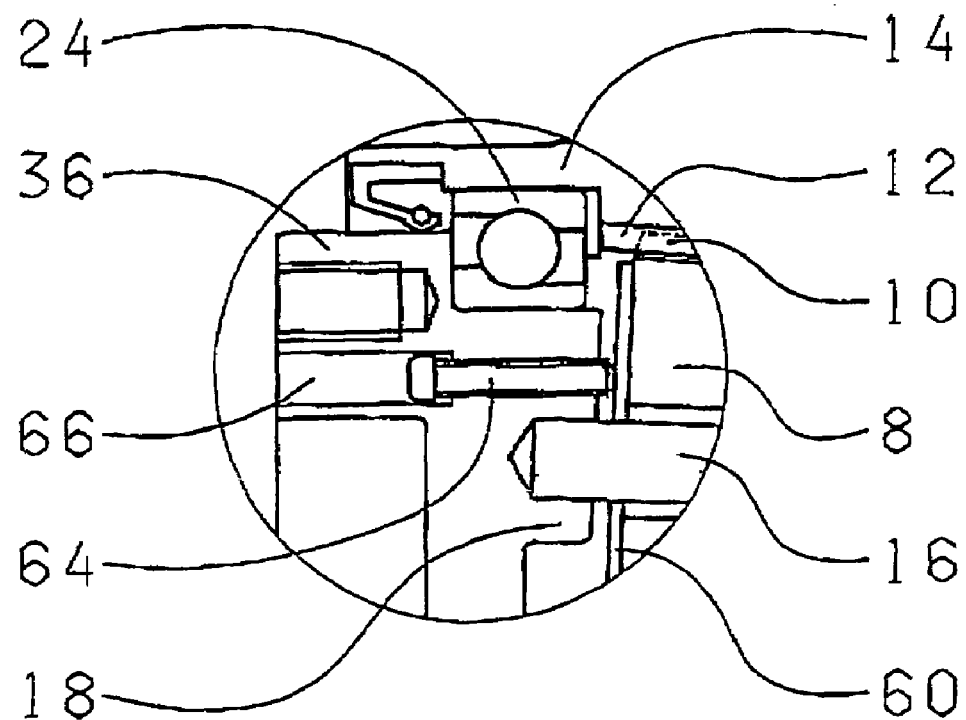
FIG. 3 is a section similar to FIG. 2 of a third embodiment.

FIG. 3 shows a third embodiment of the adjusting means in the form of a continuously feedable set screw 64. The latter is inserted via a hole 66 made in the flange 36 in a corresponding thread. By tapping the set screw 64, it makes contact with the collar 60 of the planetary gear 8 and moves the latter in the axial way already described above. This embodiment also makes the adjustment of both gearwheel pairs possible, jointly or separately, in relation to the fitting disc 32, as described above in relation to FIG. 1.

Independently of the kind of adjusting means, the planetary gear train is driven via the shaft 2; thus the sun gear 4 transmits the introduced power to the planetary gear 8. To this end, the shaft 2 can be brought to engagement, for example, with an electric motor (not shown).

The ring gear 14 is stationarily retained in a manner (not shown in detail) by fastening means that penetrate the aperture 50. The planetary gear carrier 18 functions here as an output; the input shaft of a machine (not shown) is situated on the threaded holes 38.

For expedience, the planetary gear carrier 18 is alternatively set stationarily by way of the threaded holes 38. The ring gear 14 acting then as an output correspondingly drives a machine.

REFERENCE NUMERALS 2 shaft
4 sun gear
6 outer toothing
8 planetary gear
10 outer toothing
12 inner toothing
14 ring gear
16 planetary gear axle
18 planetary gear carrier
20 blind hole
22 through aperture
24 ball bearing
26 shoulder
28 axial collar
30 incision
32 fitting disc
34 disc
36 flange
38 threaded pole
40 external peripheral surface
42 sleeve collar
44 radial shaft seal ring
46 incision
48 incision
50 aperture
52 annular flange
54 inner surface
56 front surface
58 spacer piece
60 collar
62 adjusting spring
64 set screw
66 hole
α axle inclined angle
β cone angle
δ total cone angle

The invention claimed is:

1. A planetary gear train, comprising:
   a ring gear (14),
   a sun gear (4), and
   a plurality of planetary gears (8) rotatably mounted on a planetary gear carrier (18) by corresponding planetary gear axles (16),
      wherein each planetary gear (8) is in tooth contact with the ring gear (14) and the sun gear (4),
      the planetary gear axles (16) are mounted at an inclined angle (α) with respect to an axle (2) of the sun gear (4),
      each planetary gear (16) is axially displaceable upon the corresponding planetary gear axle (16), and
   the ring gear (14) and the planetary gears (8) are of conical design, and
   an adjusting mechanism is operatively situated between the planetary gear carrier (18) and the planetary gears (8) for adjusting a position of the planetary gears (8) on the planetary gear axles (16) for a backlash.

2. The planetary gear train according to claim 1, wherein the sun gear (4) has an approximately cylindrical external toothing (6).

3. The planetary gear train according to claim 1, wherein the planet carrier (18) is connected with an output shaft of the gear train.

4. The planetary gear train according to claim 1, wherein the sun gear (4) is connected with to an input shaft (2) of a prime mover.

5. The planetary gear train according to claim 1, wherein the adjusting mechanism, between planetary gear carrier (18) and ring gear (14), comprises at least one of operative fitting discs (32) and spacer discs (34) which determine an axial position relative to each other.

6. The planetary gear train according to claim 1, wherein the adjusting mechanism operatively situated between the planetary gear carrier (18) and the plant gears (8) are spacer pieces (58) located coaxially relative to the planetary gear axles (16).

7. The planetary gear train according to claim 1, wherein the adjusting mechanism operatively situated between the planetary gear carrier (18) and the plant gears (8) are adjusting springs (62) coaxial with the planetary axles (16).

8. The planetary gear train according to claim 1, wherein the adjusting mechanism operatively situated between the planetary gear carrier (18) and the planetary gears (8) are continuously feedable set screw (64) inserted in the planetary gear carrier (18).

9. The planetary gear train according to claim 1, wherein a reduction ratio of the gear train has a value which is less than or equal to twelve.

10. The planetary gear train according to claim 1, wherein a cone angle (β) of tooth flanks of the planetary gears (8) is adapted to the inclined angle (α) of the planetary gear axles (16) so that tooth flanks of the sun gear (4) and tooth flanks of the planetary gears (8) mesh with one another over a whole tooth width.

11. The planetary gear train according to claim 10, wherein the inclined angle (α) of the planetary gear axles (16) corresponds at least approximately to the cone angle (β) of the tooth flanks of the planetary gears (8).

12. The planetary gear train according to claim 10, wherein the inclined angle (α) of the planetary gear axles (16) corresponds at least approximately to half the cone angle of the tooth flanks of the ring gear (14).

13. The planetary gear train according claim 1, wherein the planet carrier (18) is rotatably mounted in the ring gear (14).

14. The planetary gear train according to claim 13, wherein two bearings (24) are provided on both sides of a toothing plane of the planetary gears (8).

15. The planetary gear train according to claim 13, wherein bearings (24) between the ring gear (14) and the planet carrier (18) are slanted bearings (24) in an O-arrangement.

16. The planetary gear train according to claim 1, wherein at least one of the planetary gears (8) and the ring gear (14) have an incision (46, 48).

17. The planetary gear train according to claim 16, wherein the incision (46) in the planetary gears (8) is designed revolving with rotational symmetry.

18. The planetary gear train according to claim 16, wherein several peripherally spaced incisions (46) are located in the planetary gears (8).

* * * * *